Figure 1:

C. VON HOFE.
STEREOSCOPIC TELEMETER WITH TRAVELING MARK.
APPLICATION FILED JAN. 20, 1908.

934,916.

Patented Sept. 21, 1909.

Witnesses:
Paul Krüger
Fritz Sander

Inventor:
Christian von Hofe

UNITED STATES PATENT OFFICE.

CHRISTIAN VON HOFE, OF JENA, GERMANY, ASSIGNOR TO THE FIRM OF CARL ZEISS, OF JENA, GERMANY.

STEREOSCOPIC TELEMETER WITH TRAVELING MARK.

934,913.  Specification of Letters Patent.  Patented Sept. 21, 1909.

Application filed January 20, 1908. Serial No. 411,856.

*To all whom it may concern:*

Be it known that I, CHRISTIAN VON HOFE, a citizen of the German Empire, and residing at Carl-Zeiss strasse, Jena, in the Grand Duchy of Saxe Weimar, Germany, have invented a new and useful Stereoscopic Telemeter with Traveling Mark, of which the following is a specification.

The invention consists in an improvement in those stereoscopic telemeters having a "traveling mark", that is to say, in all such telemeters, in which a relative shifting between a stereoscopic measuring mark and a stereoscopic landscape image is produced in the direction of depth by a micrometrical appliance. In these instruments the distance is read off upon a micrometer scale external to the stereoscopic field of view, after the measuring mark and the image of the object, whose distance is to be determined, have been brought, through the said relative shifting, into the same depth. The two simplest means producing that shifting are already made known through the patent specification 583,703: The adjustment of the micrometrical appliance has to produce a horizontal displacement, in one of the two ocular fields, either of the physical component of the stereoscopic measuring mark, hereafter called component mark, or of the optical component of the stereoscopic image of the landscape.

In measuring the distance of objects, which are at rest or which move but slowly in the field of view, there is not to be expected quite so great a rapidity in taking measurements with the traveling mark telemeter as with the other, more simple stereoscopic telemeter, the fixed scale telemeter, but on the other hand a greater accuracy. Experience has, however, shown, that the superiority of the instrument with traveling mark over the other instrument as regards the accuracy of the measurement is not so marked, when the object, whose distance is to be measured, is more or less isolated in the direction of depth, and in the extreme case, when within the whole field of view of the instrument there is no foreground whatever and as background only the sky, this superiority may vanish altogether.

According to the present invention the accuracy of measurement of the traveling mark telemeter is maintained in the case of an object isolated in the direction of depth, if a stereoscopic auxiliary mark or a plurality of such marks be arranged in the same part of the field of view in which the stereoscopic measuring mark is situated but not in the same depth. This arrangement, whose perfect success experience has proved, has arisen from the following consideration. In measuring the distance of an object by means of a traveling measuring mark only the relative position of the stereoscopic measuring mark on the one hand and of the stereoscopic image of the object to be measured on the other is to be estimated, so that in this respect measuring mark and image of the object are of equal quality. Hence the same enhancement of the accuracy of measurement, which arises in making use of the isolated measuring mark when passing from an object isolated in the direction of depth to another having a foreground or a background, is to be expected from the arrangement of an auxiliary mark in front of or behind the measuring mark for the measurement upon the isolated object.

Figure 2:
Figure 3:
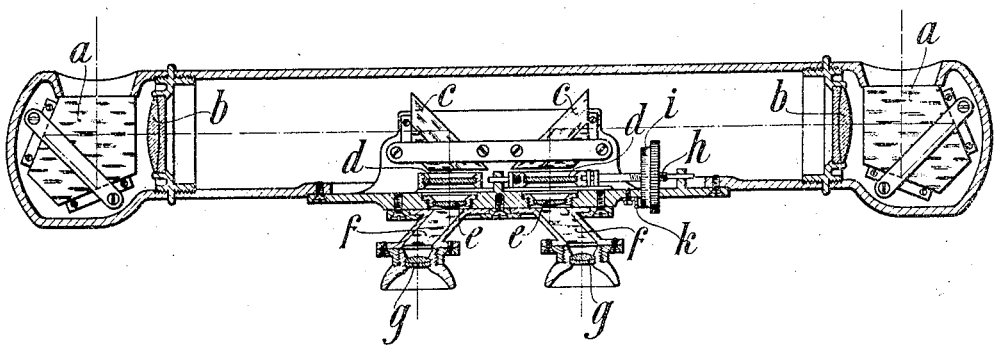

In the annexed drawing: Figure 1 represents on an enlarged scale a system of component marks adapted to be fixed in the left ocular field of a stereoscopic telemeter with traveling mark constructed according to the invention. Fig. 2 represents the mark system for the right field of the same telemeter. Fig. 3 is a sectional plan view of a traveling mark telemeter.

The auxiliary mark is—like the measuring mark—produced by two component marks, one in each ocular field. In order to give the stereoscopic auxiliary mark a position in another depth than the stereoscopic measuring mark, the distance between the two component auxiliary marks must differ from the distance between the two component measuring marks. It is convenient to have the component marks of each ocular field maintaining an unalterable position relatively to one another. In employing two or more auxiliary marks, the component marks of each ocular field are best arranged in a straight line, so that the stereoscopic marks likewise form a straight lined row. It is of especial value, when the intervals also in such a row of marks are subject to a regular order. Making the measuring mark a member in a straight lined and regular row of marks has proved, according to present experiences, still more favorable for the accuracy of the measurement than its mere combination with a single auxiliary mark or with an irregular group of such marks.

The straight lined and regular row of marks can also be made use of by leaving the place in the row unoccupied, which according to the scale on the micrometrical appliance belongs to the measuring mark. Measurement is then effected by ranging the stereoscopic image of the object to be measured in the blank space of the missing measuring mark by means of the ordinary adjustment of the micrometrical appliance.

Whether the place of the measuring mark be occupied by a mark or not the advantage gained in accuracy from measuring with a regular row of marks is enhanced by arranging two or more such rows of marks so inclined to and combined with one another, that the measuring mark is a member of all the rows.

The left and right component mark systems shown in Figs. 1 and 2 respectively produce a stereoscopic mark system, in which a big measuring mark is placed in the crossing point of two regular rows of small auxiliary marks, so that it is common to both rows. Finally, the regular row of marks may contribute to render the traveling mark telemeter available for measuring the distance of such objects which move rapidly in the field of view, that is to say, available for a purpose for which, as indicated above, the fixed scale telemeter is better adapted. A stereoscopic scale may be formed from the row of marks by adding, as shown in Figs. 1 and 2, numerals which give the distances of the figured marks for a definite position of the micrometrical appliance, the numeral of the hitherto sole measuring mark being the same which can in the said position be read off on the micrometrical scale. On this value of the scale the micrometrical appliance has to be adjusted, if the traveling mark telemeter be occasionally desired to be used as fixed scale telemeter.

In the traveling mark telemeter shown in Fig. 3, either telescopic system consists of an optical square prism $a$, an objective lens $b$, an ocular prism $c$ having a ridge surface, a mark plate $d$, a field lens $e$, a double reflecting prism $f$ and an eye lens $g$, the double reflecting prism and the eye lens being rotatable about the axis of the field lens for the purpose of adapting the distance between the eye lenses to the interpupilary distance. The left and the right mark plate carry each a component mark system, for instance, such as shown in Figs. 1 and 2 respectively. The right mark plate is shiftably mounted and rigidly connected with a micrometric screw $h$. The nut of this screw carries a cylindrical scale $i$ projecting through the casing of the telemeter so as to enable the operator to rotate it. An index $k$ is fastened on the casing. Rotating the scale shifts the right mark plate and thereby causes the traveling of the entire stereoscopic mark system.

I claim:

1. In a stereoscopic telemeter of the traveling mark type a pair of oculars, a pair of objectives for projecting a pair of object images in the fields of the pair of oculars, a pair of mark plates in the ocular fields, means for producing, in one ocular field, a relative displacement of the object image and the mark plate, a distance scale connected with this displacing means, an index for the scale, a pair of component measuring marks provided on the pair of mark plates, and a pair of component auxiliary marks likewise provided on the pair of mark plates in proximity to the component measuring marks, the distance between the two component auxiliary marks being different from that between the two component measuring marks.

2. In a stereoscopic telemeter of the traveling mark type a pair of oculars, a pair of objectives for projecting a pair of object images in the fields of the pair of oculars, a pair of mark plates in the ocular fields, means for producing, in one ocular field, a relative displacement of the object image and the mark plate, a distance scale connected with this displacing means, an index for the scale, a pair of component measuring marks provided on the pair of mark plates, and a plurality of pairs of component auxiliary marks likewise provided on the pair of mark plates in proximity to the component measuring marks, in each pair of component auxiliary marks the distance between the marks being different from that between the two component measuring marks and in each ocular field the component marks being arranged in a straight lined row with a regular order of intervals.

3. In a stereoscopic telemeter of the traveling mark type a pair of oculars, a pair of objectives for projecting a pair of object images in the fields of the pair of oculars, a pair of mark plates in the ocular fields, means for producing, in one ocular field, a relative displacement of the object image and the mark plate, a distance scale connected with this displacing means, an index for the scale, a pair of component measuring marks provided on the pair of mark plates, and at least four pairs of component auxiliary marks likewise provided on the pair of mark plates in proximity to the component measuring marks, in each pair of component auxiliary marks the distance between the marks being different from that between the two component measuring marks and in each ocular field the component marks being arranged in at least two straight lined rows inclined to each other, with a regular order of intervals in each row and with the measuring mark forming a member of all the rows.

4. In a stereoscopic telemeter of the traveling mark type a pair of oculars, a pair of objectives for projecting a pair of object images in the fields of the pair of oculars, a pair of mark plates in the ocular fields, means for producing, in one ocular field, a relative displacement of the object image and the mark plate, a distance scale connected with this displacing means, an index for the scale, a pair of component measuring marks provided on the pair of mark plates, and a plurality of pairs of component auxiliary marks likewise provided on the pair of mark plates in proximity to the component measuring marks, in each pair of component auxiliary marks the distance between the marks being different from that between the two component measuring marks and in a plurality of pairs of component marks two identical numerals being arranged one near each mark of each pair.

CHRISTIAN VON HOFE.

Witnesses:
PAUL KRÜGER,
ADOLF MAURER.